United States Patent [19]
Krone et al.

[11] Patent Number: 5,813,226
[45] Date of Patent: Sep. 29, 1998

[54] CONTROL SCHEME FOR PRESSURE RELIEF

[75] Inventors: John J. Krone, Dunlap; Yaoxin Qian, Peoria, both of Ill.

[73] Assignee: Caterpillar Inc., Peoria, Ill.

[21] Appl. No.: 929,896

[22] Filed: Sep. 15, 1997

[51] Int. Cl.$^6$ ................................................. F16D 31/00
[52] U.S. Cl. ........................... 60/327; 91/361; 91/454
[58] Field of Search ........................... 60/327, 325, 328; 91/361, 454

[56] References Cited

U.S. PATENT DOCUMENTS

| | | | |
|---|---|---|---|
| 3,793,831 | 2/1974 | Khatti | 60/471 |
| 4,580,598 | 4/1986 | Itoh | 137/596 |
| 5,138,838 | 8/1992 | Crosser | 60/433 |
| 5,211,196 | 5/1993 | Schwelm | 91/454 X |
| 5,230,272 | 7/1993 | Schmitz | 91/361 |
| 5,396,923 | 3/1995 | Allen et al. | 137/487 |
| 5,560,387 | 10/1996 | Devier et al. | 137/1 |
| 5,584,224 | 12/1996 | Davies et al. | 91/361 |
| 5,666,806 | 9/1997 | Dietz | 91/361 X |

FOREIGN PATENT DOCUMENTS

| | | |
|---|---|---|
| 0284831A2 | 3/1988 | European Pat. Off. . |
| 0420599A2 | 9/1990 | European Pat. Off. . |
| 3317605 | 5/1983 | Germany . |
| 3829991 | 9/1988 | Germany . |
| 2111250 | 11/1982 | United Kingdom . |

*Primary Examiner*—Hoang Nguyen
*Attorney, Agent, or Firm*—J. W. Burrows

[57] ABSTRACT

A control scheme is provided that controls the maximum pressure level in desired locations of a hydraulic system. This control scheme eliminates the need of separate line relief valves that many times create pressure spikes in the hydraulic system. In one example, the control scheme functions to sense the operating pressure at the desired location and compares it to a differential pressure and a desired input command during one step or loop to establish a predicted pressure level. The predicted pressure level is compared to the pressure necessary to initiate movement of the valving element in an electrically actuated control valve mechanism. The result is used to move the valving element to a predetermined position if the predicted pressure level is less than cracking pressure level and the differential pressure is greater than zero. If the predicted pressure level is higher than the cracking pressure level, an output control signal is boosted in order to move the valving element to an open position in a much quicker time period to offset the over pressure condition before a pressure spike occurs.

12 Claims, 3 Drawing Sheets

CONTROL SCHEME FOR PRESSURE RELIEF

TECHNICAL FIELD

This invention relates generally to a control scheme for pressure relief of a hydraulic system more particularly to a control scheme for pressure relief that does not use a separate relief valve.

BACKGROUND ART

It is well known to provide pressure relief in a hydraulic system by providing various pressure relief valves in the system. These known relief valves function to receive the pressurized fluid in the system and controllably open once the pressure exceeds a predetermined pressure level. In many of these known systems, several pressure relief valves are required which increases the cost of the machine. Furthermore, many of these known pressure relief valves tends to have "pressure overshoots (pressure spikes)" during the initial stages of pressure relief. Pressure overshoot generally relates to the magnitude of the pressure above the predetermined pressure level that the pressure relief valve is subjected to during use. Sudden increases in the pressure within the system will many times cause the pressure overshoot because the valving element within the pressure relief valve cannot respond quick enough. Consequently, during sudden increases of pressure in the hydraulic system, the pressure level of the fluid in the hydraulic system exceeds the predetermined pressure level prior to the pressure relief valve opening. Once the pressure relief valve opens, the pressure level of the fluid in the system returns to the predetermined pressure level. These pressure overshoots are many times detrimental to the hydraulic system since they may far exceed the predetermined maximum pressure level set by the pressure relief valve.

There has been attempts to control the opening of the pressure relief valve by using a microprocessor to monitor various system parameters and direct a signal to the pressure relief valve to open it in response to the received signal. These systems still require using various pressure relief valves. U.S. Pat. No. 5,138,838 teaches using the directional control valve to control the pressure level in the cylinder lines by sensing the pressure level in the respective cylinder ports and controllably communicating the fluid in the appropriate cylinder port to the reservoir across the directional valve if the pressure level therein exceeds a predetermined value. The subject patent does not teach how to ensure that pressure overshoots are eliminated or at least minimized.

The present invention is directed to overcoming one or more of the problems as set forth above.

DISCLOSURE OF THE INVENTION

In one aspect of the present invention, a method is provided for controlling the pressure level of pressurized fluid in a hydraulic system having a source of pressurized fluid, a fluid actuator, an electrically actuated control valve mechanism disclosed between the source of pressurized fluid and the fluid actuator, an input controller connected to the electrically actuated control valve mechanism and operative to generate an electrical signal representative of the desired input, an electronic controller operative to receive the signal from the input controller and direct an output signal therefrom to the electrically actuated control valve mechanism, and a reservoir. The method includes the steps of sensing the pressure level of the fluid at a predetermined location in the hydraulic system, establishing a predicted pressure level based on the relationship of at least the sensed pressure level and the magnitude of the differential pressure determined over a predetermined time period, comparing the predicted pressure level to a predetermined pressure level that is representative of the pressure level needed to move the electrically actuated control valve mechanism to a position that is ready to initiate communication of the pressurized fluid with the reservoir, comparing an input command signal with a command signal needed to initiate movement of the electrically actuated control valve mechanism to the position that it is ready to initiate communication of the pressurized fluid with the reservoir, directing the input command signal to the electrically actuated control valve mechanism for movement thereof if the input command signal is greater than the command signal needed to initiate opening of the electrically actuated control valve mechanism, comparing the predicted pressure level to a predetermined percentage of the predetermined pressure level necessary to move the electrically actuated control valve mechanism to a position that is ready to initiate communication of the pressurized fluid to the reservoir, and moving the electrically actuated control valve mechanism to a position that is representative of the result of the step of comparing the predicted pressure level to a predetermined percentage of the predetermined pressure level necessary to move the electrically actuated control valve mechanism to a position that is ready to initiate communication of the pressurized fluid to the reservoir.

BEST MODE FOR CARRYING OUT THE INVENTION

Figure 1:
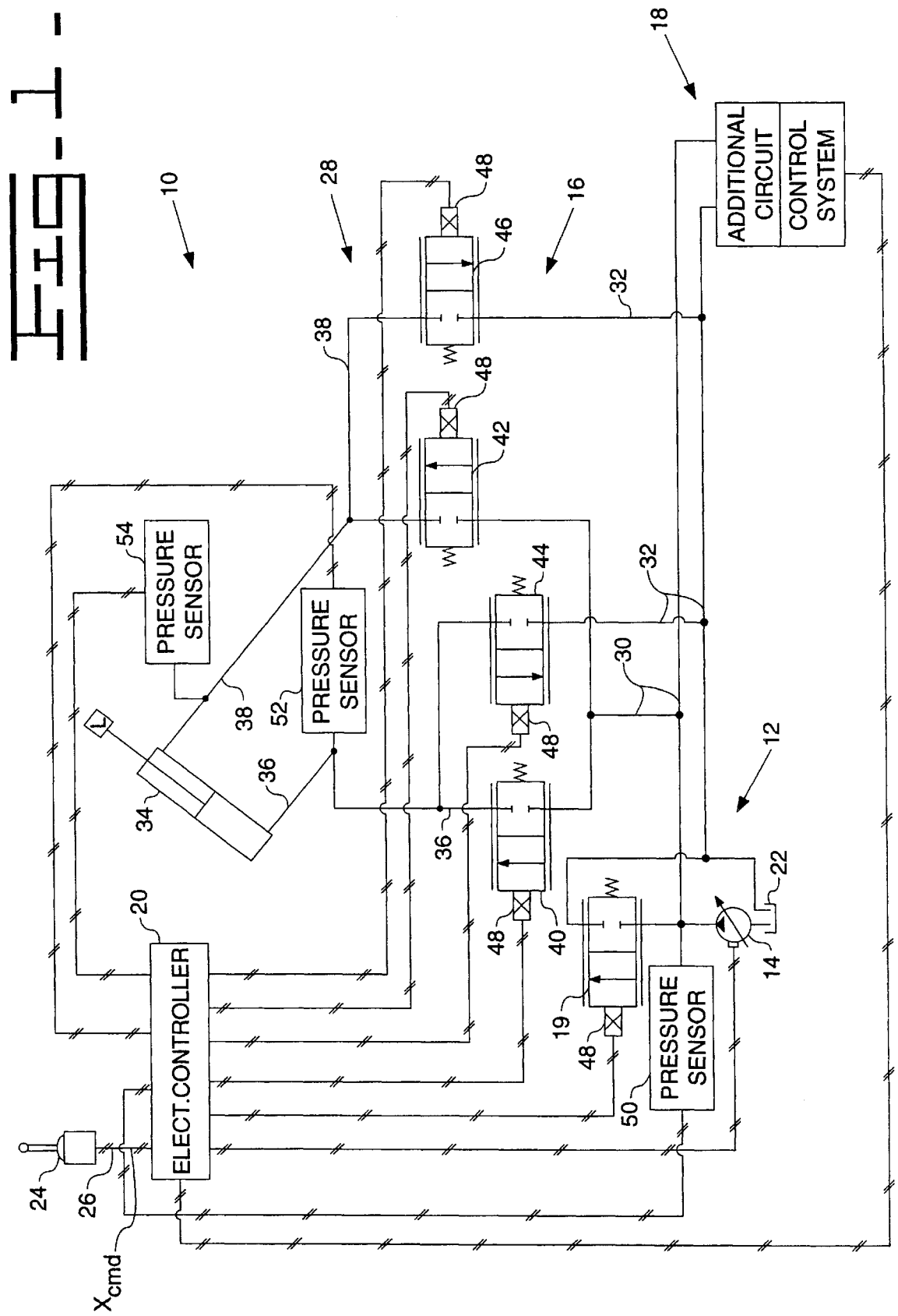
FIG. 1 is a schematic representation of a hydraulic system incorporating an embodiment of the subject invention.

Referring to the drawings and more particularly to FIG. 1, a hydraulic system 10 is illustrated and includes a source of pressurized fluid 12, such as a variable displacement pump 14, first and second hydraulic circuits 16, 18, an electrically controlled bypass valve 19, an electronic controller 20 and a reservoir 22. For the subject invention, the source of pressurized fluid could be the pressure at any place within the system without departing from the essence of the invention. The pressure could be generated by the pump, the magnitude of the load, changes in the velocity of the implement or cylinder of any other parameter in the system that is capable of generating a pressure on the fluid at that location. Even though only first and second hydraulic circuits 16, 18 are illustrated, it is recognized that additional circuits could be used without departing from the essence of the invention. Since the first and second hydraulic circuits 16, 18 are substantially the same, only one of them is illustrated and described herein.

The first hydraulic circuit 16 includes an input controller 24 connected to the electronic controller 20 by an electrical line 26 and operative to generate an electrical input command signal $X_{cmd}$ that is representative of the operator's input. The first hydraulic circuit 16 also includes an electrically actuated control valve mechanism 28 connected to the source of pressurized fluid by a conduit 30 and to the reservoir 22 by a conduit 32. The electrically actuated control valve mechanism 28 is fluidly connected to a fluid actuator 34 by first and second conduits 36, 38.

The electrically actuated control valve mechanism 28 includes first, second, third, and fourth electrically controlled proportional valves 40, 42, 44, 46. Each of the proportional valves are two position valves spring biased to a first blocking position and proportionally movable towards an open flow position in response to receipt of an electrical signal from the electronic controller 20 to the respective electrical drivers 48.

A first pressure sensor 50 is connected to the pressure conduit 30 and is operative to direct an electrical signal to the electronic controller 20 that is representative of the pressure of the fluid in the pressure conduit 30. A second pressure sensor 52 is connected to the conduit 36 and is operative to direct an electrical signal to the electronic controller 20 that is representative of the pressure of the fluid in the pressure conduit 36. A third pressure sensor 54 is connected to the conduit 38 and is operative to direct an electrical signal to the electronic controller 20 that is representative of the pressure of the fluid in the pressure conduit 38. It is recognized that other pressure sensors could be connected to other parts of the hydraulic circuit 16 or to other parts of the hydraulic system 10 to sense and direct an electrical signal to the electronic controller 20 that is representative of the pressure (source of pressurized fluid) in that part of the circuit or system without departing from the essence of the invention.

The additional circuit 18 is connected to the electronic controller 20 through the electrical connection 56 and functions in substantially the same way as that described with respect to the first circuit 16.

Figure 2:
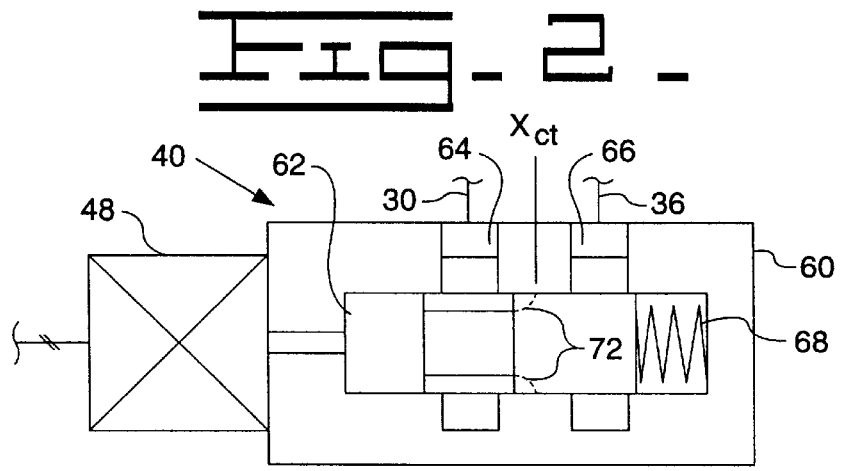
FIG. 2 is a diagrammatic cross-sectional representation of an electrically actuated valve mechanism used in the subject embodiment.
Figure 3:
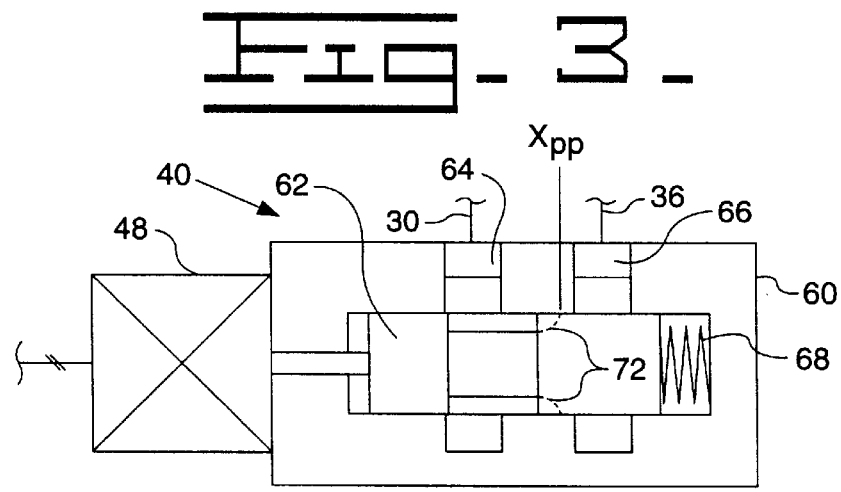
FIG. 3 illustrates the valving element of the valve mechanism of FIG. 2 in a different position.
Figure 4:
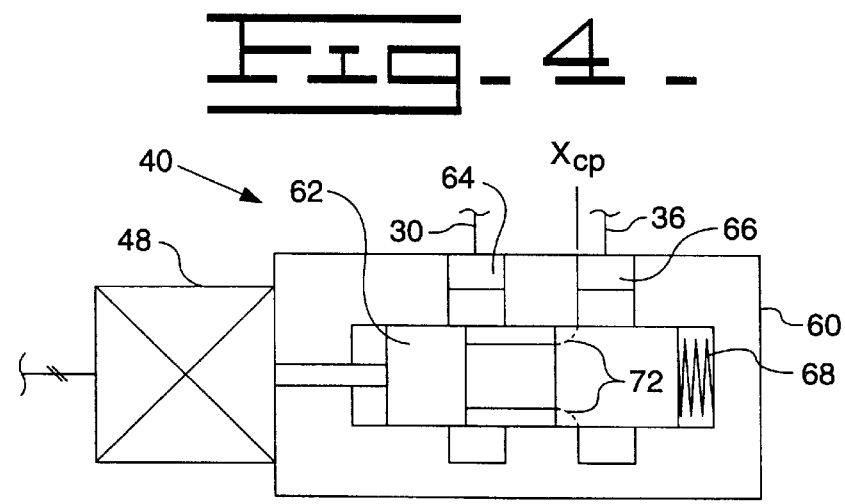
FIG. 4 illustrates the valving element of the valve mechanism of FIG. 2 in yet a different position.

Referring to FIGS. 2–4, a diagrammatic representation of one of the electrically controlled proportional valves 40, 42, 44, 46 is illustrated. Since each one has basically the same construction only one will be described hereafter. The electrically controlled proportional valve 40 is being described and includes a housing 60, a valving element 62, inlet/outlet ports 64, 66, a spring 68, and the electrical driver 48. In FIG. 2, the valving element 62 is illustrated in its flow blocking position. A metering orifice 72 of the valving element 62 is at a position "$X_{ct}$" which represents the neutral or centered position.

In FIG. 3, the valving element 62 has moved against the bias of the spring 68 in response to an input command signal being directed to the electrical driver 48 to a position "$X_{pp}$". This position represents a position wherein the metering orifice 72 is just short of the position at which the metering orifice 72 would permit communication of fluid thereacross from inlet port 64 to the outlet port 66.

In FIG. 4, the valving element 62 has moved to a position "$X_{cp}$" which represents a critical position. The critical position is the position at which the metering orifice 72 is at a position at which fluid flow between the inlet port 64 and the outlet port 66 is ready to be initiated.

Figure 5:
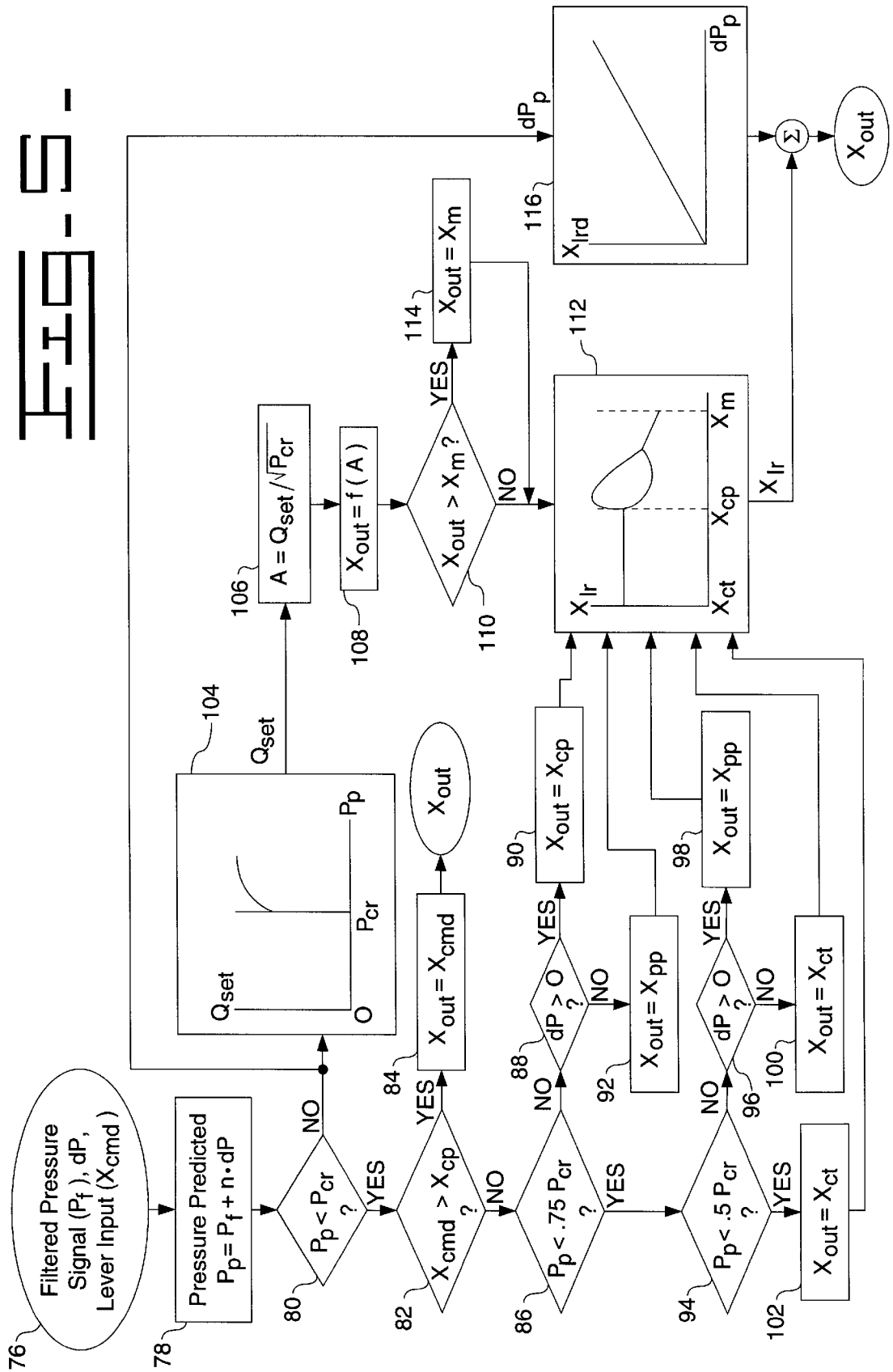
FIG. 5 is flow diagram illustrating the control scheme of the subject invention.

Referring to FIG. 5, a flow diagram illustrates the control scheme utilized to provide control of the maximum pressure level in various parts of the hydraulic system 10. The following list of definitions are provided to aid in understanding the letters and symbols used in the flow diagram.

$P_f$ sensed pressure that represents the current system pressure or a set of previously sensed pressure levels at the pre-selected location in the system and has been filtered through a low pass filter.

$P_p$ a predicted pressure that is based on the rate of pressure rise that is being sensed as the system pressure at the sensed location rises.

$P_{cr}$ the pressure necessary in the system at the sensed location that is used to initiate movement of the valving element 62 towards a flow passing position, commonly referred to as valve cracking pressure.

T the length of time of the sampling step or the loop time.

dP the difference in pressure in the system as measured between one step or loop, i.e. change in pressure over a period of time.

g the pressure predict filter function used to estimate future pressure levels of a fluid.

A the area of the metering slot at a given position.

f a function representing the shape of the orifice.

n number of loops—one loop being the required time to sample data, process and generate an output control signal $Q_{set}$ desired flow rate $X_{out}$ derived signal that is used to establish the position of the valving element $X_{cmd}$ command signal from the input control level that is representative of the desired position of the valving element $X_m$ maximum magnitude of the valving element positioning control signal $X_{cp}$ control signal needed to move the valving element to the critical position or the position at which the valving element is ready to communicate fluid therethrough $X_{pp}$ control signal needed to move the valving element to the pre-position or the position at which the valving element is just short of the critical position ($X_{cp}$)

$X_{ct}$ control signal needed to move the valving element to the neutral or closed position $X_{lrd}$ control output position signal from a derivative control map $X_{lr}$ control output position signal from a booster control map It is important to establish a predicted pressure level in order to initiate corrective action prior to the system pressure reaching an extreme pressure level. The predicted pressure level $P_p$ is generally based on a pressure predict filter function (g) which depends on the current sensed pressure level or a set of previously sensed pressure levels ($P_f$) the length of time of the sampling period or step (T), and the number of steps or loops predicted (n). This being more clearly set forth by the following relationship: $P_p = g(P_f, T, n)$. The pressure predict filter function go could be any method for estimating future pressure levels of the fluid based on the current and/or past sensed pressure levels. One method could be a linear prediction method, i.e. based on the relationship of the current sensed pressure level and the magnitude of the differential pressure determined during one step or loop. Another method could be a moving average method, i.e. the weighted average of consecutively sensed pressure data at one point. Still another method could be an exponential moving average method, i.e. moving average in which the more recent sensed pressure data may be given more weight. It is recognized that there may be other methods for determining the predicted pressure level without departing from the essence of the subject invention.

In FIG. 5, one of the above noted methods for determining the predicted pressure is used as an example. More specifically, block 76 receives signals representative of a sensed filtered pressure level $P_f$, the differential pressure level dP, and the input command signal $X_{cmd}$ from the input controller 24. Block 78 uses the signals from the block 76 to develop and generate a predicted pressure level $P_p$. Once the predicted pressure level is determined, regardless of the pressure predict filter function method used, the program uses the predicted pressure level, as set forth hereinafter. Decision block 80 compares the predicted pressure level $P_p$ to the valve cracking pressure $P_{cr}$. If the predicated pressure level $P_p$ is less than the valve cracking pressure $P_{cr}$, the program moves to a decision block 82.

The decision block 82 compares the input command signal $X_{cmd}$ to the critical position signal $X_{cp}$. If the input command signal $X_{cmd}$ is greater than the critical position signal $X_{cp}$, then the output command signal $X_{out}$ is set equal to the input control signal $X_{cmd}$ as indicated in block 84 and the output control signal $X_{out}$ is directed to the appropriate one of the electrically controlled proportional valves 40, 42, 44, 46. If the input command signal $X_{cmd}$ signal is equal to or less than the critical position signal $X_{cp}$, the program moves to a decision block 86.

The decision block 86 compares the predicted pressure $P_p$ with a predetermined higher pressure level–a percentage of the valve cracking pressure $P_{cr}$. In this decision block, the predetermined percentage is seventy-five percent. However, it is recognized that other percentages could be used without departing from the essence of the subject invention. If the predicted pressure $P_p$ is not less than seventy-five percent of the valve cracking pressure $P_{cr}$, the program moves to a decision block 88.

In the decision block 88, the program decides whether the differential pressure dP is greater than zero. As shown in block 90, if the differential pressure dP is greater than zero, the magnitude of the output control signal $X_{out}$ that determines the position of the valving element 62 is set to the same as the critical position signal $X_{cp}$. As shown in block 92, if the differential pressure dP is equal to or less than zero, the magnitude of the output control signal $X_{out}$ is equal to the magnitude of the pre-position signal $X_{pp}$.

In the decision block 86, if the predicted pressure $P_p$ is less than the higher pressure level seventy-five percent of the valve cracking pressure $P_{cr}$, the program moves to a decision block 94. The decision block 94 compares the predicted pressure $P_p$ to a predetermined second higher pressure level. In this decision block, the predetermined second higher pressure level is fifty percent of the valve cracking pressure $P_{cr}$. If the predicted pressure $P_p$ is not less than fifty percent of the valve cracking pressure $P_{cr}$, the program moves to a decision block 96.

In the decision block 96, the program determines if the differential pressure dP is greater than zero. As shown in block 98, if the differential pressure dP is greater than zero, the magnitude of the output control signal $X_{out}$ that determines the position of the valving element is the same as the pre-position signal $X_{pp}$. As shown in block 100, if the differential pressure dP is equal to or less than zero, the magnitude of the output control signal $X_{out}$, is set equal to the magnitude of the valve centered or neutral position signal $X_{cr}$.

In the decision block 94, if the predicted pressure $P_p$ is less than fifty percent of the valve cracking pressure $P_{cr}$, the program moves to a block 102. As shown in the block 102, if the predicted pressure $P_p$ is less than fifty percent of the valve cracking pressure $P_{cr}$, the magnitude of the electrical signal out $X_{out}$ that determines the position of the valving element is set to the same level as the valve centered or neutral position signal $X_{cr}$.

In the decision block 80 if the predicted pressure $P_p$ is the same as or greater than the valve cracking pressure $P_{cr}$ the program moves to a block 104 that contains a flow-set map. The flow-set map in block 104 uses the predicted pressure $P_p$ to establish a desired flow rate. Depending on the amount that the predicted pressure $P_p$ is above the valve cracking pressure $P_{cr}$, the flow-set map determines how much the valving element should open in order to control the maximum pressure and alleviate any pressure spikes.

Once the desired valving element opening is determined, the program moves to a block 106 in which the signal from the block 104 is used to define a signal that is representative of an equivalent orifice area. In the block 106, the flow-set pressure signal is divided by the square root of the cracking pressure $P_{cr}$ to establish the signal that is representative of an equivalent orifice area.

The program moves to block 108 where the equivalent orifice area is multiplied by a factor 'f' that is a function of the shape of the metering orifice 72. The result is an electrical signal that is representative of the output control signal $X_{out}$. The program moves to a decision block 110 where the output control signal $X_{out}$ is compared to the maximum position control signal $X_m$.

If the output control signal $X_{out}$ is equal to or less than the maximum position control signal $X_m$, the program moves to a block 112 that has a booster control map.

As shown in a block 114, if the output control signal $X_{out}$ is greater than the maximum position control signal $X_m$, the output control signal $X_{out}$ is set equal to the maximum position control signal $X_m$. From block 114, the program moves back to the booster control map block 112. In the booster control map block 112, if the output control signal $X_{out}$ is greater than the critical position signal $X_{cp}$, the booster control map block 112 functions to boost the signal and generate an output control signal $X_{lr}$. Any input command signals being directed to the booster control map block 112 that is less than the critical position signal $X_{cp}$ is passed therethrough without being modified.

In decision block 80, if the predicted pressure $P_p$ is equal to or greater than the valve cracking pressure $P_{cr}$, the program also moves to a block 116 having a derivative control map. The derivative control map uses the differential pressure dP of the predicted pressure $P_p$ to establish a pressure derivative control signal $X_{lrd}$. The pressure derivative control signal $X_{lrd}$ and the booster output control signal $X_{lr}$ are summed in a block 118. The result of the summation provides the final output command signal $X_{out}$ that is directed to the appropriate electrically actuated control valve 19,44,46 to control the pressure in the respective lines 30,36,38.

Industrial Applicability

During operation of the hydraulic system 10 illustrated in FIG. 1, the maximum pressure level of the fluid in the various parts of the system is controlled by the subject method or control scheme described above without the use of separate line relief valves. It may be necessary to control the maximum level of some circuits at various levels thus it is necessary to either control the maximum pressure level in the system or to control the maximum pressure level in the fluid lines connected to the cylinder or actuator. High pressure levels or pressure spikes are many times created due to sudden changes in the load being handled or by sudden changes in the volume of fluid being directed to the work cylinder or actuator 35. Also pressure spikes may be generated by quickly stopping a moving load.

In the subject control scheme, the pressure levels are controlled without the use of separate relief valves. The control scheme continuously monitors different locations in the hydraulic system 10 through the use of the pressure sensors 50,52,54. The sensed pressure signals are filtered in a normal manner to provide a more precise, "clean" signal. The command input signal made through the input controller 24 is also monitored in cooperation with the differential pressure dP, if any, in the system. It is recognized that other parts of a system could be monitored, if desired, and the pressure level therein controlled.

The processor in the electronic controller 20 must have the ability to quickly process the information and generate a final output command signal $X_{out}$. The time needed is referred to as the loop time. That is the time needed for the processor to gather and interpret the information, then generate the proper final output command signal $X_{out}$. The loop time should be in the order of less than 10 milli-seconds and preferably in the range of 2–5 milli-seconds.

In order to determine that the desired maximum pressure level is going to be exceeded and to react to the maximum pressure level being exceeded before it actually happens, the control scheme first establishes a predicted pressure level $P_p$ based on the sensed pressure, the differential pressure dp and the input command signal $X_{cmd}$. The processor quickly processes the predicted pressure level $P_p$ and generates a final command output signal $X_{out}$ that completes one loop. The final command output signal $X_{out}$ positions the appropriate electrically controlled proportional valve 19/44/46 accordingly. In the next and subsequent loops, the electronic controller 20 continues to provide a predicted pressure level $P_p$ based on the sensed pressure, the differential pressure and the input command signal $X_{cmd}$ and generates a final command output signal $X_{out}$.

As noted above, in each loop various step are performed. For example, once the predicted pressure level $P_p$ is determined it is compared to the valve cracking pressure $P_{cr}$. If the predicted pressure level $P_p$ is greater than the valve cracking pressure $P_{cr}$, the predicted pressure level $P_p$ is passed on to the flow-set map block 104 where it is used to determine the magnitude of flow needed to be relieved in order to offset the predicted pressure level that is above the desired maximum pressure level. Once the magnitude of flow is determined, the size of the needed metering orifice 72 is determined in block 106. The shape of the metering orifice 72 within the valving element 62 is considered in block 108 and the output command signal $X_{out}$ is generated.

If the output command signal $X_{out}$ from block 108 is greater than the maximum position control signal $X_m$, the output command signal $X_{out}$ is set equal to the maximum position control signal $X_m$ and passed on to the booster control map 112. If the output command signal $X_{out}$ from the decision block 110 is not greater than the maximum position control signal $X_m$, the output command signal $X_{out}$ from the decision block 110 is passed to the booster control map 112.

In the booster control map 112, the output command $X_{out}$ from the block 110 is modified or boosted depending on the magnitude of the output control signal $X_{out}$. The resulting output control signal $X_{lr}$ is then summed with the derivative output control signal $X_{lrd}$ from the derivative control map 116 to establish the final output control signal $X_{out}$ that is used to open the appropriate electrically controlled proportional valve 19/44/46 to relieve the excess pressure buildup.

With the electronic controller 20 processing each loop in a very short time increment, any time the predicted pressure $P_p$ level is larger than the valve cracking pressure $P_{cr}$ level the appropriate electrically controlled proportional valve 19/44/46 is moved to an open, flow passing position. The degree of opening depends on how much greater the predicted pressure $P_p$ is relative to the valve cracking pressure $P_{cr}$.

In decision block 80, when the predicted pressure $P_p$ is less than the valve cracking pressure $P_{cr}$, the program compares, in decision block 82, the input command signal $X_{cmd}$ to the critical position signal $X_{cp}$. If the input command signal $X_{cmd}$ is greater than the critical position signal $X_{cp}$, the input command signal $X_{cmd}$ is directed to the appropriate electrically controlled proportional valve 19/44/46 in a normal manner.

In decision block 82, if the input command signal $X_{cmd}$ is less than the critical position signal $X_{cp}$, the program compares, in decision block 86, the predicted pressure level $P_p$ to a value equal to seventy-five percent of the valve cracking pressure $P_{cr}$. If the predicted pressure level $P_p$ is equal to or greater than seventy-five percent of the valve cracking pressure $P_{cr}$, the program determines, in block 88, if the differential pressure dP is greater than zero. If it is, the control output signal $X_{out}$ is set equal to the critical position signal $X_{cp}$ and is directed to the appropriate electrically controlled proportional valve 19/44/46 through the booster control map 112. As illustrated in the booster control map 112, as long as each of the output control signals $X_{out}$ being directed to the booster control map 112 is not greater than the valve critical position signal $X_{cp}$, the boost control map has no effect on the respective output control signals.

In decision block 88, if the differential pressure dP is not greater than zero, the program sets the output control signal $X_{out}$ equal to the valve pre-position signal $X_{pp}$ and directs it through the booster control map 112 to the appropriate electrically controlled proportional valve 19/44/46.

If the predicted pressure $P_p$ is less than seventy-five percent of the valve cracking pressure $P_{cr}$, the program compares, in block 94, the predicted pressure $P_p$ to a value equal to fifty percent of the valve cracking pressure $P_{cr}$. If the predicted pressure $P_p$ is greater than fifty percent of the valve cracking pressure $P_{cr}$, the program determines, in decision block 96, if the differential pressure dP is greater than zero. If the differential pressure is greater than zero, the output control signal $X_{out}$ therefrom is set equally to the valve pre-set position signal $X_{pp}$ and delivered to the booster control map 112. If the differential pressure dP is not greater than zero, the output control signal therefrom $X_{out}$ is set equal to the valve centered or neutral position signal $X_{ct}$ and delivered to the booster control map 112.

In block 102, if the predicted pressure $P_p$ is less than fifty percent of the valve cracking pressure $P_{cr}$, the output control signal $X_{cmd}$ therefrom is set equal to the valve centered or neutral position $X_{ct}$ and delivered to the booster control map 112.

The above sequence of events is happening during every loop to ensure that the appropriate electrically controlled proportional valve 19/44/46 is being moved to the proper position in time to relieve any excess pressure conditions that may be subjected to parts of the system.

As generally noted above, the control scheme functions to anticipate excess pressure conditions and either initiates movement of the valving element 62 towards an open position prior to the pressure level reaching the excess pressure condition or moves the valving element 62 to a near open position if the sensed conditions predict that the pressure level may continue to rise to a level greater than the maximum pressure level.

If the valving element 62 has been moved towards an open position and subsequent loops determine that the initial predicted pressure $P_p$ is no longer valid, the valving element 62 may hold at a near open position $X_{pp}$ or move back to a centered or neutral position $X_{cr}$. If the valving element 62 has moved to a near open position and subsequent loops indicate that the initial predicted pressure $P_p$ is still a valid prediction, the valving element 62 moves towards an open position to relieve the excess pressure condition. However, if subsequent loops determine that the predicted pressure $P_p$ is no longer valid, the valving element moves back towards the centered or neutral position.

In view of the foregoing, it is readily apparent that by using the above noted method or control scheme to control the pressure level in a hydraulic system, separate pressure relief valves are not needed. Likewise, pressure spikes that many times are associated with known relief valves are basically eliminated.

Other aspects, objects and advantages of the invention can be obtained from a study of the drawings, the disclosure and the appended claims.

We claim:

1. A method for controlling the pressure level of pressurized fluid in a hydraulic system having a source of pressurized fluid, a fluid actuator, an electrically actuated control valve mechanism disclosed between the source of pressurized fluid and the fluid actuator, an input controller connected to the electrically actuated control valve mechanism and operative to generate an electrical signal representative of the desired input, an electronic controller operative to receive the signal from the input controller and direct an output signal therefrom to the electrically actuated control valve mechanism, and a reservoir, the method comprises the following steps:

sensing the pressure level of the fluid at a predetermined location in the hydraulic system;

establishing a predicted pressure level based on at least the relationship of a pressure predict filter function, the sensed pressure level, the length of time of each sample step, the number of steps;

comparing the predicted pressure level to a predetermined pressure level that is representative of the pressure level needed to move the electrically actuated control valve mechanism to a position that is ready to initiate communication of the pressurized fluid with the reservoir;

comparing an input command signal with a command signal needed to initiate movement of the electrically actuated control valve mechanism to the position that it is ready to initiate communication of the pressurized fluid with the reservoir;

directing the input command signal to the electrically actuated control valve mechanism for movement thereof if the input command signal is greater than the command signal needed to initiate opening of the electrically actuated control valve mechanism;

comparing the predicted pressure level to a predetermined percentage of the predetermined pressure level necessary to move the electrically actuated control valve mechanism to a position that is ready to initiate communication of the pressurized fluid to the reservoir; and moving the electrically actuated control valve mechanism to a position that is representative of the result of the step of comparing the predicted pressure level to a predetermined percentage of the predetermined pressure level necessary to move the electrically actuated control valve mechanism to a position that is ready to initiate communication of the pressurized fluid to the reservoir.

2. The method of claim 1 wherein in the step of moving the electrically actuated control valve mechanism, the electrically actuated control valve mechanism is moved to the position that it is ready to initiate communication of the pressurized fluid with the reservoir in response to the differential pressure being greater than zero.

3. The method of claim 2 wherein in the step of moving the electrically actuated control valve mechanism, the electrically actuated control valve mechanism is moved to a position that is generally adjacent to the position that it is ready to initiate communication of the pressurized fluid with the reservoir in response to the differential pressure being zero or less.

4. The method of claim 3 wherein in the step of comparing the predicted pressure level to a predetermined percentage of the predetermined pressure level the electrically actuated control valve mechanism is moved to the position that it is ready to initiate communication of the pressurized fluid with the reservoir in response to the predicted pressure level being above seventy-five percent of the pressure needed to move it to the position that it is ready to initiate communication of the pressurized fluid with the reservoir.

5. The method of claim 4 wherein in the step of comparing the predicted pressure level to a predetermined percentage of the predetermined pressure level the electrically actuated control valve mechanism is moved to the position where it is generally adjacent to the position that it is ready to initiate communication of the pressurized fluid with the reservoir in response to the predicted pressure level being greater than fifty percent but less than seventy-five percent of the pressure needed to move it to the position that it is ready to initiate communication of the pressurized fluid with the reservoir.

6. The method of claim 5 including the step of establishing a second predicted pressure level based on the relationship of at least the sensed pressure level and the magnitude of the differential pressure determined over a second predetermined time period and comparing the second predicted pressure level with the predetermined pressure level that is representative of the pressure level needed to move the electrically actuated control valve mechanism to a position that is ready to initiate communication of the pressurized fluid with the reservoir.

7. The method of claim 6 including the step of directing the second predicted pressure level to a booster control arrangement if the second predicted pressure level is above the pressure level needed to move the electrically actuated control valve mechanism to a position that is ready to initiate communication of the pressurized fluid with the reservoir.

8. The method of claim 7 wherein the step of directing the second predicted pressure level to a booster control arrangement includes the steps of directing the second predicted pressure level through a flow set mechanism to produce an output signal that is representative of the relationship of the second predicted pressure level and the position of the electrically actuated control valve mechanism and the step of directing the output signal from the flow set mechanism to an equivalent orifice area arrangement to establish a control output signal that is representative of a position of the electrically actuated control valve mechanism to provide the flow established by the flow set mechanism.

9. The method of claim 8 including the step of directing the signal from the equivalent orifice area arrangement to the booster control to quickly move the electrically actuated control valve mechanism from its position at or generally adjacent the position at which the electrically actuated control valve mechanism is ready to initiate communication of the pressurized fluid with the reservoir to an open position in response to the control output signal from the equivalent orifice area arrangement.

10. The method of claim 9 including the steps of comparing the differential pressure of the predicted pressure level to a position of the electrically actuated control valve mechanism through a derivative control to produce a derivative signal and summing the derivative signal with the control output signal from the booster control mechanism to generate a final output control signal to the electrically actuated control valve mechanism.

11. The method of claim 10 wherein in the steps of establishing the first and second predicted pressure levels the predetermined time period is in the range of two to five milliseconds.

12. The method of claim 1 wherein in the step of sensing the pressure level and the step of establishing a predicted pressure level, the sensed pressure level is a set of pressure levels determined over previous sample steps.

\* \* \* \* \*